A. BARNES.
APPARATUS FOR CLOSING WATER SUPPLIES TO TAPS AND OTHER FITTINGS.
APPLICATION FILED MAR. 3, 1913.
1,070,100. Patented Aug. 12, 1913.
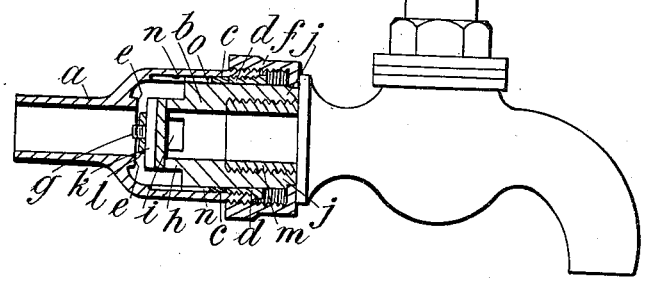
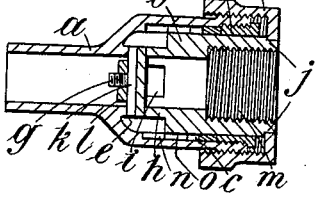
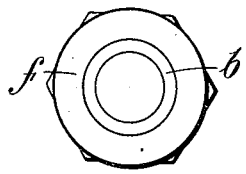
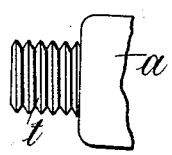
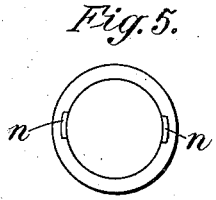
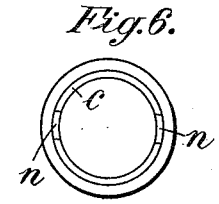
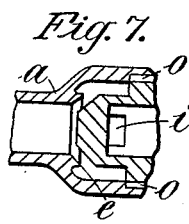
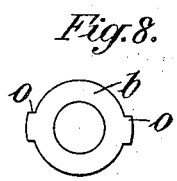
WITNESSES
John H. Siggers
William A. Jacobs
INVENTOR,
Albert Barnes,
BY E. G. Siggers
ATTORNEY.

UNITED STATES PATENT OFFICE.

ALBERT BARNES, OF BRIGHTON, ENGLAND.

APPARATUS FOR CLOSING WATER-SUPPLIES TO TAPS AND OTHER FITTINGS.

1,070,100.

Specification of Letters Patent.   Patented Aug. 12, 1913.

Application filed March 3, 1913.   Serial No. 751,789.

*To all whom it may concern:*

Be it known that I, ALBERT BARNES, a subject of His Majesty the King of England, residing at 37 Loder road, Brighton, in the county of Sussex, Kingdom of England, have invented a certain new and useful Apparatus for Closing Water-Supplies to Taps and other Fittings, of which the following is a specification.

This invention relates to apparatus for closing water supplies to taps and other fittings, and has for its object to provide means whereby the taps or fittings can readily be detached for repairs without disturbing the water service to other parts of a building thereby avoiding the inconvenience of turning off the stop tap and drawing off the water from cisterns.

The invention consists broadly of a brass ferrule or boss which is connected to the water supply pipe and which carries within a shaped telescopic sliding plug, which when pushed back on to a seating in the said boss seals off the outlet to the water pipe.

In further explaining my invention reference will hereinafter be made to the accompanying sheet of drawings in which:—

Figure 1 is a sectional side elevation of an ordinary bib tap showing my invention applied thereto in sectional view with the plug open; Fig. 2 is a detail sectional view showing the plug closed; Fig. 3 is a front view of the apparatus; and Figs. 4, 5, 6, 7, 8 and 9 illustrate six small details hereinafter specifically referred to.

In carrying out this invention I attach to the supply pipe the brass ferrule or boss $a$ one end of which may be left plain for connecting to lead pipes as shown in Figs. 1 and 2, or screw threaded for connecting to iron pipes or brass unions as at $t$ Fig. 4 while the other end has a large socket with smooth turned seating $e$ at the back, the front inner portion is turned out to form a recess or packing space $c$ to receive packing of greased yarn or the like and a metal packing ring if desired, the remaining portion is screw threaded to receive a brass push or packing cap $d$. The outer end of the boss $a$ is fitted with a screwed cap $f$, which when turned opens or closes the valve as required. The inner portion at back has two slots cut at $n$ $n$ to receive the projecting lugs $o$ $o$ on the plug $b$ hereinafter described. Within the boss $a$ is placed a hollow shaped plug $b$ which is recessed and reduced in diameter at its inner end $h$ the reduced end is perforated on its sides to form water ways $i$ $i$. On the extreme inner end is a fixed threaded spindle $g$ to receive a washer $k$ which may be leather, fiber, rubber, or the like, the washer is kept in position by means of a nut $l$ screwed on to the aforesaid spindle or if preferred the end $p$ of the plug $b$ can be solid metal shaped and ground as in Fig. 7. The outer end of the plug $b$ is screw threaded as shown at $m$ on the inside to receive the tap or like fitting and on the outside it is recessed at $j$ to receive the screw cap $f$ and on its inner end it has two projecting lugs $o$ $o$ at its sides to correspond with the slots in the aforesaid boss $a$ in which the plug slides.

To operate the apparatus, the aforesaid plug $b$ is pushed back in telescopic fashion by screwing up the cap $f$ until the washer $k$ on its inner end comes into contact with the turned seating $e$ on the aforesaid boss $a$. The water supply is by this means sealed off and the tap or fitting can then be removed for repair and when the fitting is replaced by unscrewing the aforesaid cap $f$ the water is then obtainable again through the tap or fitting.

When using the apparatus on water supply pipes to valve closets, pillar taps, ball valves and the like fittings an ordinary nut, boss or union is required.

What I claim as my invention and desire to secure by Letters Patent of the United States is:—

1. A means for the purpose described, comprising a socket member with a valve seat at the inner end of the socket portion and formed at the other or mouth end with a screw-threaded packing space, such socket member being also provided with longitudinally extended guiding means, a plug adapted to and movable lengthwise of the interior of the socket member and also provided with guiding means coacting with those of the socket, said plug having a valve at one end for engaging the valve seat in the socket member and at the other end peripherally recessed and internally screw-threaded, a packing cap adapted to the packing space in the socket member, and a screw cap exterior to the socket member and shaped to engage in the recessed end of the plug.

2. A means for the purpose described, comprising a socket member having a valve seat at one end, a hollow plug movable lengthwise of the socket member and provided with a valve adapted to the valve seat and at the end remote from the valve threaded to receive a tap or fitting, the plug and socket having coacting means for preventing turning of the plug within the socket, a packing member seated in the open or mouth end of the socket in packing relation to the plug, and a cap threaded on the socket exterior thereto and engaging the outer or free end of the plug to retain the latter in the socket and cause its movement toward the valve seat.

In testimony whereof I have hereunto signed this specification this 17th day of February 1913.

ALBERT BARNES.

Witnesses:
J. S. WITHERS,
FRANK BLAKEY.

Copies of this patent may be obtained for five cents each, by addressing the "Commissioner of Patents, Washington, D. C."